United States Patent [19]

Mueller

[11] Patent Number: 5,086,704
[45] Date of Patent: Feb. 11, 1992

[54] MOTOR VEHICLE TURNTABLE

[75] Inventor: Wieland R. Mueller, Aliquippa, Pa.

[73] Assignee: Michael E. Mueller, Richmond, Canada

[21] Appl. No.: 583,465

[22] Filed: Sep. 17, 1990

[51] Int. Cl.$^5$ .............................................. B60S 13/02
[52] U.S. Cl. ......................................... 104/44; 104/36
[58] Field of Search .............. 104/44, 46, 36, 38, 104/39, 43, 35; 198/803.16

[56] References Cited

U.S. PATENT DOCUMENTS

| | | | |
|---|---|---|---|
| 1,237,022 | 8/1917 | Craig . | |
| 1,772,858 | 8/1930 | Coffey | 104/44 |
| 1,881,033 | 10/1932 | Smith | 104/44 |
| 1,977,864 | 10/1934 | Smith | 104/44 |
| 2,044,031 | 6/1936 | Van Nieuwland . | |
| 3,040,674 | 6/1962 | Bolton | 104/44 |
| 3,566,798 | 3/1971 | Peitzman | 104/44 |
| 3,854,404 | 2/1972 | Janda | 104/44 |
| 3,898,935 | 8/1975 | Norlie et al. | 104/44 |
| 3,934,551 | 1/1976 | Sulzberger | 119/14.04 |
| 4,562,774 | 1/1986 | Dehring | 104/44 |
| 4,608,929 | 9/1986 | Park | 104/44 |
| 4,716,837 | 1/1988 | Valencia | 104/38 |

Primary Examiner—Robert J. Oberleitner
Assistant Examiner—Kevin D. Rutherford
Attorney, Agent, or Firm—Buchanan Ingersoll

[57] ABSTRACT

An improved motor vehicle turntable is provided that may be installed in any location, typically in front of a garage for the purpose of rotating a vehicle so as to enable it to leave the area in the opposite direction from which it entered the garage. The motor vehicle turntable has a circular vehicle receiving platform supported by a polygonal support frame. The receiving platform and support frame are received within a cylindrical pit so that the upper surface of the platform is level with the surrounding terrain into which the pit is formed. A chain drive frictionally engages the perimeter of the polygonal support frame to rotate the receiving platform when the chain is moved by means of a drive motor and sprocket arrangement. The drive motor and sprocket arrangement provide a spring biasing to the chain to frictionally engage the perimeter of the support frame under normal operating conditions, but which permits loosening of the chain to manually rotate the receiving platform and support frame if there is a power outage or equipment malfunction.

12 Claims, 4 Drawing Sheets

MOTOR VEHICLE TURNTABLE

BACKGROUND OF THE INVENTION

1. Field of the Invention

This invention relates to motor vehicle turntables that may be utilized to turn motor vehicles about a pivot point so that the motor vehicles may be rotated to a direction different than their direction when driven onto the turntable. In many instances, such as narrow driveways, automobile showrooms, garages or the like, it is useful to be able to change the direction of a vehicle when there is not adequate room to turn the vehicle as it is being operated. This invention provides a unique turntable for permitting redirectional rotation of the vehicle.

2. Description of the Prior Art

Motor vehicle turntables have been known for years. U.S. Pat. No. 1,237,022 discloses an early motor vehicle turntable. These turntables have taken various forms and configurations. U.S. Pat. No. 3,898,935 discloses a turntable which utilizes powered cylinders to rotate it.

U.S. Pat. No. 3,040,674 discloses an aircraft turntable with an elaborate, heavy duty positioning apparatus. U.S. Pat. No. 3,566,798 discloses an automobile turntable with a large, expensive circular gear to turn the turntable.

U.S. Pat. No. 3,854,404 discloses a heavy duty turntable utilizing casters to assist in rotation of the turntable. U.S. Pat. No. 4,608,929 discloses a turntable having a large, expensive gear for activating the turntable and having radio controlled transmitters and receivers to initiate rotation of the turntable.

U.S. Pat. No. 1,977,864 and U.S. Pat. No. 2,044,031 disclose examples of vehicle turntables which utilize the power of the vehicle engine, transmitted through the driving wheels of the vehicle to the turntable, to rotate the turntable itself.

The foregoing patents illustrate that there is a need for a simple, easily constructed vehicle turntable which may be readily power operated, but which may also be operated manually to reposition a vehicle in the event of a power failure or an equipment failure with the vehicle in an inconvenient position.

SUMMARY OF THE INVENTION

In accordance with the present invention, there is provided a motor vehicle turntable having a circular vehicle receiving platform supported by a polygonal support frame. A recessed cylindrical pit receives the platform and the frame so that the upper surface of the platform is level with the surrounding terrain into which the pit is formed. Bearings are provided to rotatably support the platform and the support frame for rotation about the axis of the circular vehicle receiving platform. A drive chain frictionally engages the perimeter of the polygonal support frame to rotate the receiving platform when the chain is moved. A drive sprocket engages the drive chain and is rotated by a drive motor upon selective rotation of the drive motor whereby the chain is moved to rotate the platform. A spring biased sprocket maintains the chain in frictional engagement with the polygonal support frame when the motor operates to rotate the platform. The spring biased sprocket operates to relieve tension on the chain so that the platform may be moved manually in the same direction as it normally operates by manually moving the polygonal support frame relative to the chain.

Accordingly, the principal object of the present invention is to provide an easily constructed motor vehicle turntable which is power operated and which may be rotated manually in the event of power failure or equipment failure.

Another object of the present invention is to provide a motor vehicle turntable that is driven by a frictionally engaged chain arrangement that is easily constructed and relatively inexpensive.

Another object of the present invention is to provide a motor vehicle turntable that may be operated by manual switching or that may be operated from within the vehicle by radio transmitters and receivers.

These and other objects of the present invention will be more completely disclosed and described in the following specification, the accompanying drawings, and the appended claims.

DESCRIPTION OF THE PREFERRED EMBODIMENT

Figure 1:
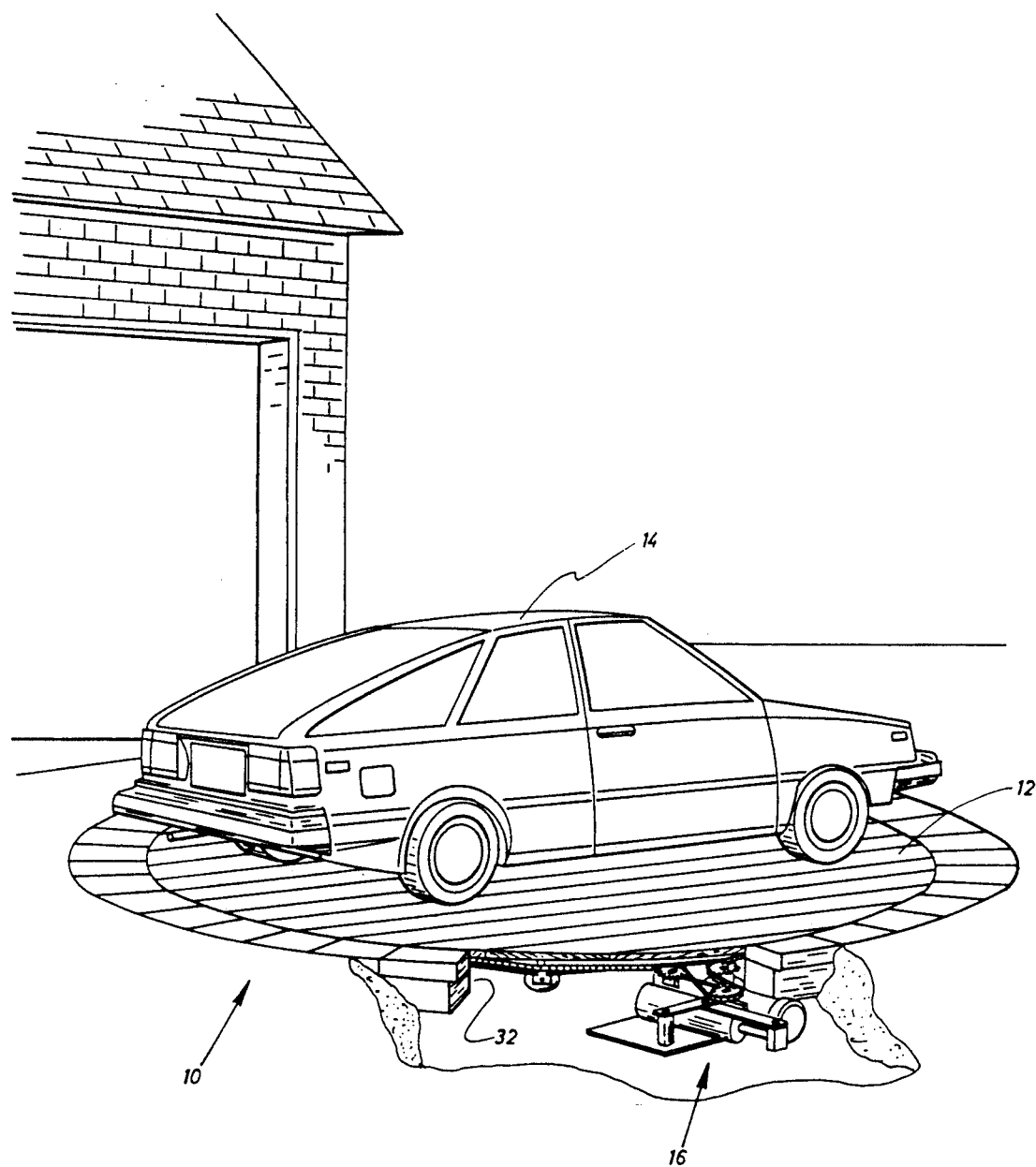
FIG. 1 is a perspective view of the turntable of the present invention with an automobile shown thereon.

Referring to the drawings and particularly to FIG. 1, there is shown a motor vehicle turntable indicated generally at 10 that has a vehicle receiving platform 12 supporting a motor vehicle 14 thereon. A drive assembly indicated generally at 16 operates to rotate the platform 12.

Figure 2:
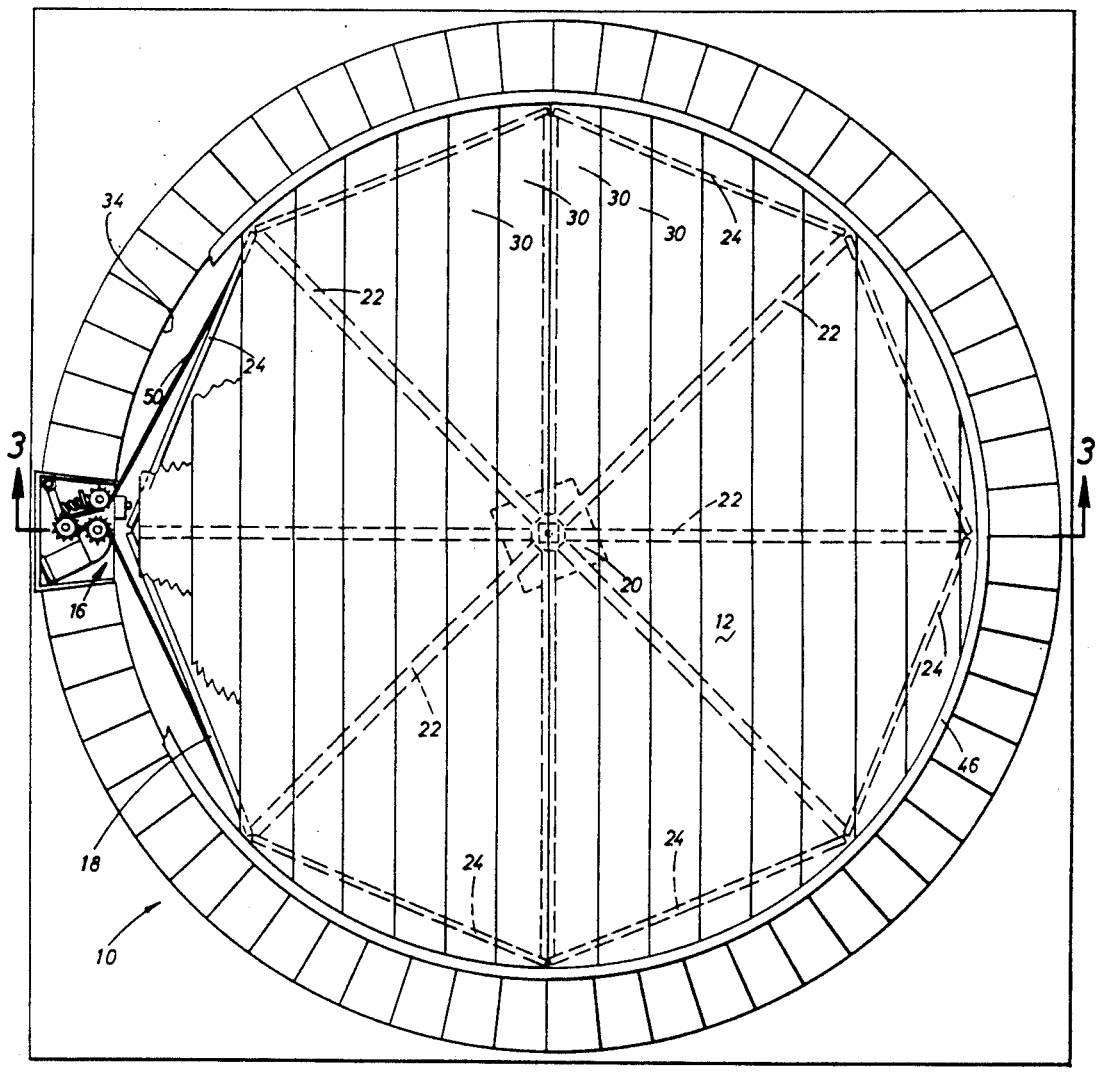
FIG. 2 is a top plan view of the turntable of FIG. 1 with a portion broken away for clarity.
Figure 3:
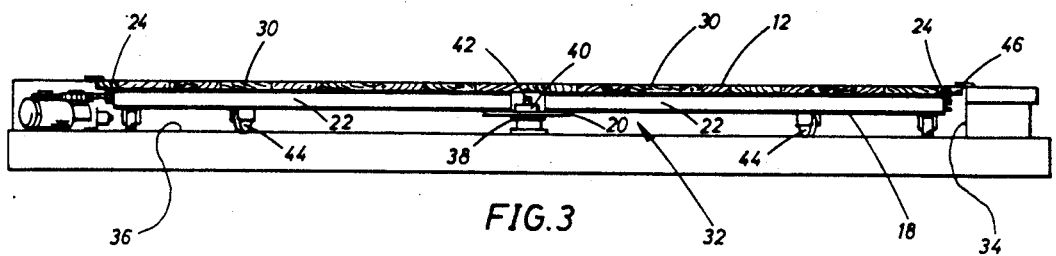
FIG. 3 is a sectional elevation taken along line 3—3 of FIG. 2.
Figure 6:
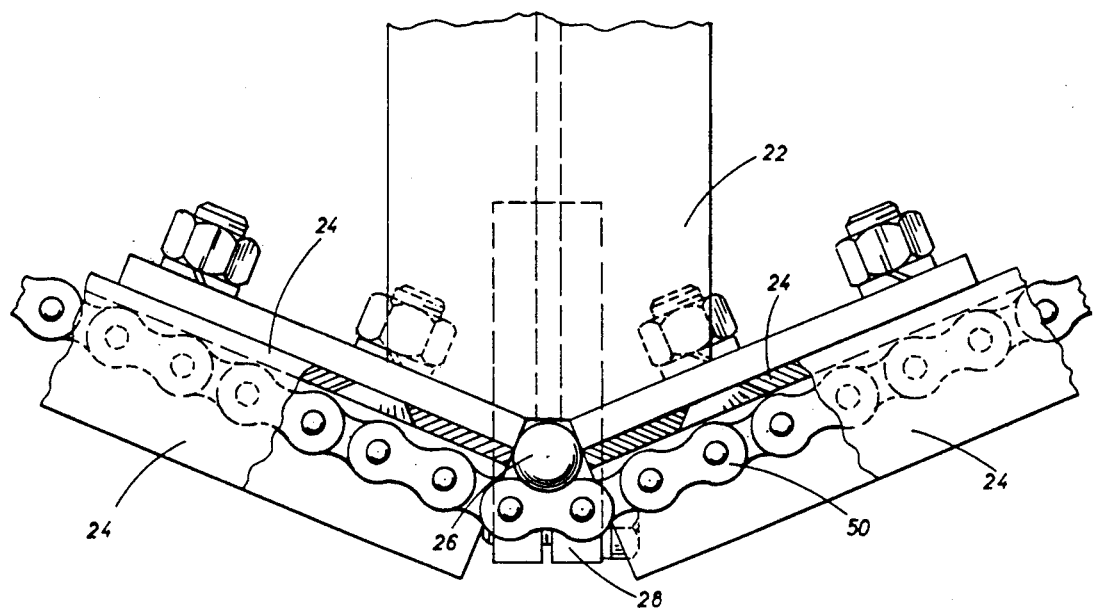
FIG. 6 is a partial top plan view of the support platform of the present invention showing details of the chain guide.
Figure 7:
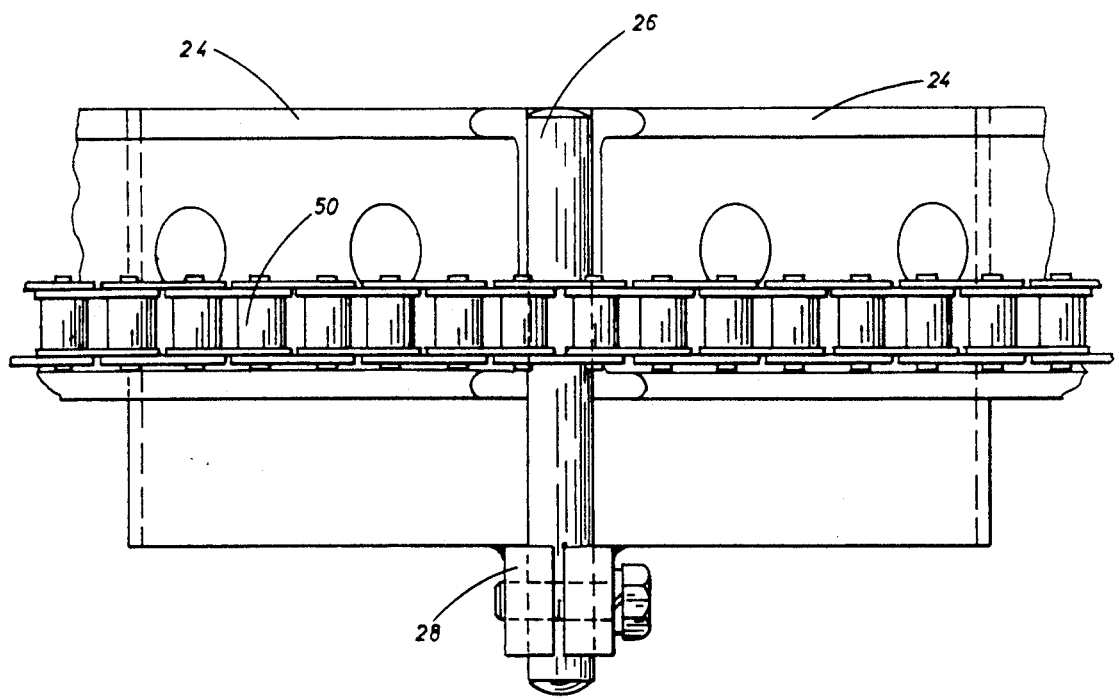
FIG. 7 is an elevational view showing the details of FIG. 6.

As best seen in FIGS. 2 and 3, a supporting frame 18 supports the vehicle receiving platform 12. Supporting frame 18 is formed from a central plate 20 that has eight (8) steel beams 22 extending radially from it and which are welded to the central plate 20. Chain receiving channels 24 which are preferably formed of steel channel are affixed at each end to adjacent steel beams 22 to form a polygonal outer perimeter for the supporting frame 18. As shown in FIG. 2, the polygonal outer perimeter takes the form of an octagon. As best seen in FIGS. 6 and 7, chain guides 26 which are formed as solid cylindrical pins are positioned between adjacent ends of the respective chain receiving channels 24 and held in place by clamps 28 that are affixed to the steel beams 22.

Wooden planks 30 are secured to the top of the support frame 18 to form the vehicle receiving platform 12. The support frame 18 and the vehicle receiving platform 12 are positioned within a shallow cylindrical pit 32 that has a cylindrical side wall 34 (FIG. 3) and a bottom wall 36. The wooden planks 30 may be of treated wood to withstand the weather and the size of the planks 30, the support frame 18 and the pit 32 are such that the planks are level with the area surrounding pit 32. As shown in FIGS. 1 and 2, the side wall 34 of pit 32 is formed from a plurality of concrete blocks but this manner of forming the pit is illustrative only and it will be appreciated that any type of construction which provides a shallow cylindrical pit having accurate dimensions will be equally applicable. In like manner, while wooden planks 30 are shown for the surface of the vehicle receiving platform, other types of material such as steel plates, fiberglass, or the like, may be utilized for the platform.

A central thrust bearing 38 and ball bearing 40 (FIG. 3) rotatably support the support frame 18 and vehicle receiving platform 12 about a central shaft 42 fixed within the center of pit 32. A plurality of casters 44, preferably located at the junctions of the chain receiving channels 24 and steel beams 22 are provided to roll along the bottom wall 36 of pit 32 to facilitate rotation of the platform. A safety ring 46 preferably formed of aluminum is fastened to the periphery of the vehicle receiving platform 12 to overlie the space between the vehicle receiving platform 12 and the cylindrical side wall 34 of pit 32. The safety ring prevents debris from entering the pit and prevents accidental tripping or the like by persons walking over the platform.

Figure 4:
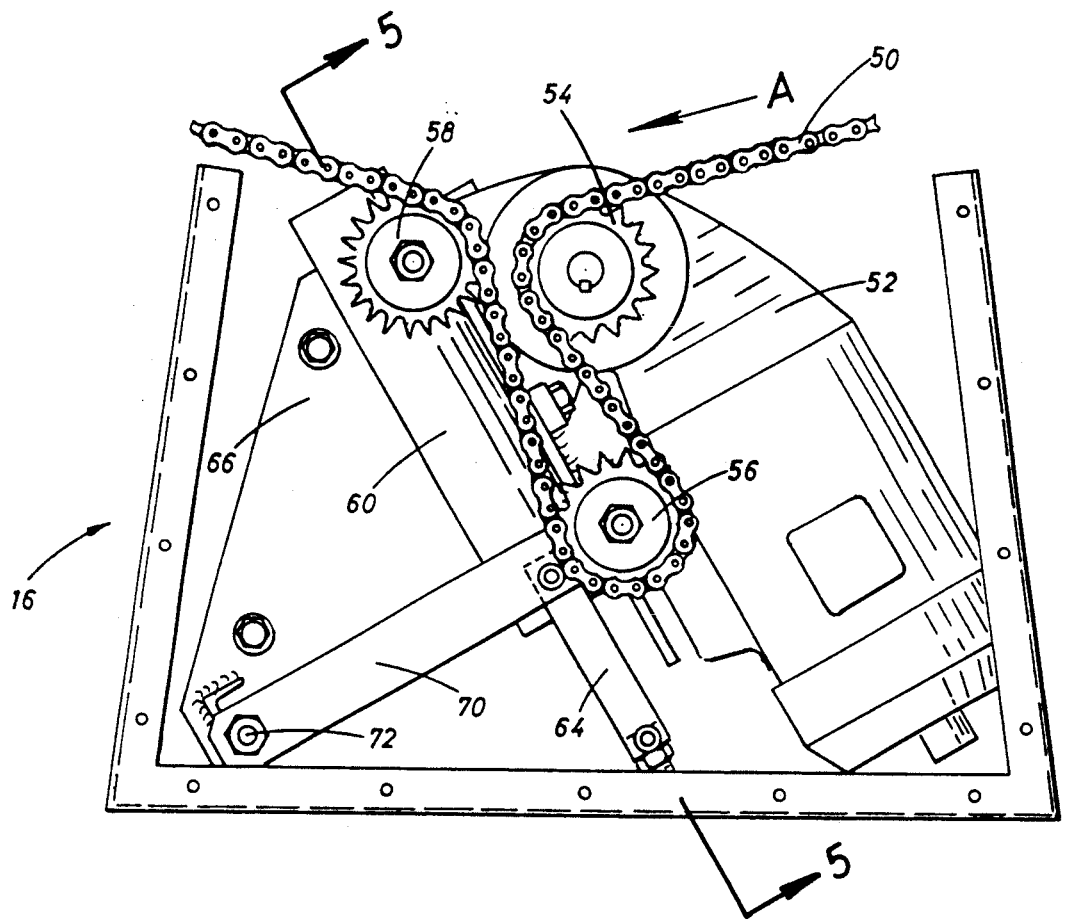
FIG. 4 is a top plan view of the motor and drive assembly of the vehicle turntable.
Figure 5:
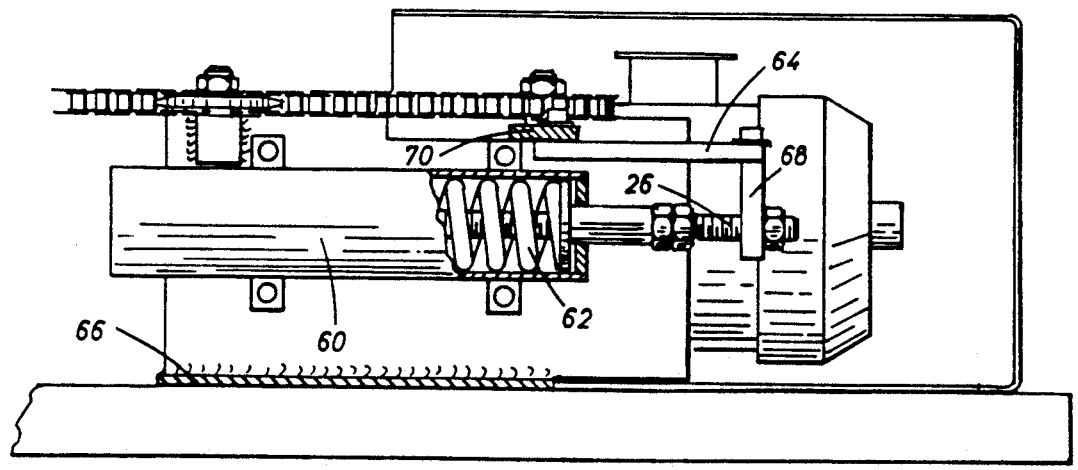
FIG. 5 is a partial sectional elevation of the drive assembly of FIG. 4 taken along line 5—5 of FIG. 4.

A chain 50 extends around the support frame 18 in frictional engagement with the chain receiving channels 24 which make up the perimeter of support frame 18. A drive motor 52 (FIGS. 4 and 5) is operatively connected to the chain 50 by drive sprocket 54. Drive motor 52 preferably has an internal gear reduction arrangement whereby actuation of drive motor 52 will drive the turntable of the present invention at approximately one revolution per minute when the motor 52 is actuated. Also provided on the drive assembly 16 is a spring biased sprocket 56 as well as a fixed idler sprocket 58. A cylinder 60 containing a compression spring 62 (FIG. 5) urges arm 64 away from the cylinder 60. Cylinder 60 is fixed to the mounting plate 66 to which drive motor 52 is also fixed. As seen in FIG. 5, the spring 62 of cylinder 60 acts upon arm 64 through a block 68 fixed to the piston of cylinder 60. Arm 64, in turn, is secured to sprocket arm 70 which is pivotally secured to the mounting plate 66 by pivot bolt 72. The spring biased sprocket 56 is rotatably mounted on sprocket arm 70.

As shown in FIGS. 1, 2 and 3, the drive assembly is mounted in the pit 32. As shown in FIGS. 4 and 5, the chain 50 which extends around the perimeter of support frame 18 within the chain receiving channels 24 is threaded over drive sprocket 54, around spring biased sprocket 56, and around fixed idler sprocket 58. The chain 50 is continuous. Under normal operation, when the drive motor 52 is rotated, the chain 50 will move in the direction indicated by arrow A shown in FIG. 4. Accordingly, the platform 12 moves in a clockwise direction as viewed in FIG. 2. It will be seen that the direction of rotation of sprocket 54 exerts a pull on chain 50 and the frictional engagement of chain 50 with the chain receiving channels 24 of support frame 18 rotates the platform 12. The spring biased sprocket 56 maintains a tension on chain 50 during normal operations to keep the chain 50 in frictional contact with the chain receiving channels 24.

If there should be a loss of power through a power outage to motor 52, or if there should be a malfunction of the motor or the wiring to the motor, the platform 18 may be rotated manually by pushing on the vehicle 14 positioned on the platform. One able-bodied person can exert enough force on the platform 12 to rotate it manually. When a force is manually exerted on vehicle receiving platform 12 in a clockwise direction as viewed in FIG. 2, the force overcomes the spring bias of spring 62 and causes the spring biased sprocket 56 to move toward sprockets 54 and 58 as viewed in FIG. 4 to thereby cause the chain to loosen around the support frame 18 to permit rotation of the support frame 18 within the chain 50 and relative thereto.

Conventional control circuits (not shown) are provided for the motor 52. The motor 52 may be operated by a manual circuit that has a manual switch to turn the motor on and limit switches (not shown) positioned to limit the rotation of vehicle receiving platform 12 to 180° of rotation (or such other angular rotation as may be desired in a particular installation). In like manner, radio transmitter operated circuits may be provided, similar to conventional garage door opening circuits, to actuate the motor 52 while a person is within the vehicle on the turntable. In most instances, both types of circuit will be provided on the same installation. The conventional electrical circuits will have appropriate overload arrangements.

As may be seen from the foregoing description, the motor vehicle turntable of the present invention is simple and inexpensive in construction, provides for emergency operation of the turntable manually in the event of power failure or equipment failure so that the operator of the motor vehicle can always position the vehicle for use in the event the turntable stops in an inaccessible position, and provides safety features such as the safety ring 46 to prevent accidents at the turntable.

According to the provisions of the Patent Statutes, I have explained the principle, preferred construction and mode of operation of my invention, and have illustrated and described what I now consider to represent its best embodiment. However, it should be understood that, within the scope of the appended claims, the invention may be practiced otherwise than as specifically illustrated and described.

I claim:

1. A motor vehicle turntable comprising:
   a circular vehicle receiving platform supported by a polygonal support frame;
   a recessed cylindrical pit receiving said platform and said frame so that the upper surface of said platform is level with the surrounding terrain into which said pit is formed;
   bearing means to rotatably support said platform and said support frame for rotation about the axis of said circular vehicle receiving platform;
   a drive chain directly frictionally engaging the perimeter of said polygonal support frame to rotate said receiving platform when said chain is moved;
   a drive sprocket engaging said drive chain and being rotated by a drive motor upon selective rotation of said motor whereby said chain is moved to rotate said platform;
   spring means to maintain said chain in direct frictional engagement with said polygonal support frame when said motor operates to rotate said platform and to release the frictional engagement between said chain and said polygonal support frame when said platform is rotated manually in the same direction;
   said spring biasing means operating to relieve tension on said chain automatically whereby said platform has a manually operated mode when said motor is not operating and said platform is moved manually in the same direction as it normally operates by manually moving said polygonal support frame relative to said chain.

2. The motor vehicle turntable of claim 1 wherein said polygonal support frame is an octagon.

3. The motor vehicle turntable of claim 1 wherein said circular vehicle receiving platform has a safety ring attached to said platform periphery and overlying the edge of said pit.

4. The motor vehicle turntable of claim 1 wherein said circular vehicle receiving platform is formed from wooden planks secured to said polygonal support frame.

5. The motor vehicle turntable of claim 1 wherein said polygonal support frame is formed of a plurality of steel beams welded to a central plate and extending radially therefrom with a plurality of chain receiving channels secured at their respective ends to the ends of adjacent beams to form the outer perimeter of said support frame said chain receiving channels directly receiving said chain therein.

6. The motor vehicle turntable of claim 1 wherein said motor is an electric motor.

7. A motor vehicle turntable comprising:
a circular vehicle receiving platform formed from a plurality of wooden planks supported by an octagonal support frame;
said support frame being formed of a plurality of steel beams welded to a central plate and extending radially therefrom with a plurality of chain receiving channels secured at their respective ends to the ends of adjacent beams to form the outer perimeter of said support frame;
a recessed cylindrical pit receiving said platform and said frame so that the upper surface of said platform is level with the surrounding terrain into which said pit is formed;
bearing means to rotatably support said platform and said support frame for rotation about the axis of said circular vehicle receiving platform;
a drive chain directly frictionally engaging the perimeter of said octagonal support frame to rotate said receiving platform when said chain is moved;
a drive sprocket engaging said drive chain and being rotated by an electric drive motor upon selective rotation of said motor whereby said chin is moved to rotate said platform;
biasing means including a spring biased sprocket to maintain said chain in direct frictional engagement with said octagonal support frame when said electric motor operates to rotate said platform and to release the frictional engagement between said chain and said polygonal support frame when said platform is rotated manually in the same direction;
said biasing means operating to relieve tension on said chain automatically whereby said platform has a manually operated mode when said motor is not operating and said platform is moved manually in the same direction as it normally operates by manually moving said polygonal support frame relative to said chain.

8. The motor vehicle turntable of claim 7 wherein said circular vehicle receiving platform has a safety ring attached to said platform periphery and overlying the edge of said pit.

9. The motor vehicle turntable of claim 7 wherein said chain is first positioned over said drive sprocket, is then positioned over said spring biased sprocket and is then positioned over an idler sprocket, said idler sprocket rotating about an axis that is fixed relative to said drive motor, whereby said drive sprocket pulls said chain tightly against said octagonal support frame to frictionally engage said frame as said drive sprocket rotates.

10. The motor vehicle turntable of claim 7 wherein said support frame has a plurality of casters affixed thereto to aid in rotation of said support frame relative to said pit.

11. The motor vehicle turntable of claim 7 wherein chain guides are secured to said support frame at each junction of said chain receiving channels.

12. A motor vehicle turntable comprising:
a circular vehicle receiving platform formed from a plurality of wood planks supported by an octagonal support frame;
said support frame being formed of a plurality of steel beams welded to a central plate and extending radially therefrom with a plurality of chain receiving channels secured at their respective ends to the ends of adjacent beams to form the outer perimeter of said support frame;
a plurality of chain guides secured to said support frame at each junction of said chain receiving channels;
a recessed cylindrical pit receiving said platform and said frame so that the upper surface of said platform is level with the surrounding terrain into which said pit is formed;
bearing means to rotatably support said platform and said support frame for rotation about the axis of said circular vehicle receiving platform;
a plurality of caster affixed to said support frame to aid in rotation of said support frame relative to said pit;
a drive chain directly frictionally engaging the perimeter of said octagonal support frame to rotate said receiving platform when said chain is moved;
a drive sprocket engaging said drive chain and being rotated by an electric drive motor upon selective rotation of said motor whereby said chain is moved to rotate said platform;
biasing means including a spring biased sprocket to maintain said chain in direct frictional engagement with said octagonal support frame when said electric motor operates to rotate said platform and to release the frictional engagement between said chain and said polygonal support frame when said platform is rotated manually in the same direction;
said chain being first positioned over said drive sprocket, then being positioned over said spring biased sprocket, and next being positioned over an idler sprocket, said idler sprocket rotating about an axis that is fixed relative to said drive motor, whereby said drive sprocket pulls said chain tightly against said octagonal support frame to frictionally engage said frame as said drive sprocket rotates;
said biasing means operating to relieve tension on said chain automatically whereby said platform has a manually operated mode when said motor is not operating and said platform is moved manually in the same direction as it normally operates by manually moving said polygonal support frame relative to said chain.

* * * * *

UNITED STATES PATENT AND TRADEMARK OFFICE
CERTIFICATE OF CORRECTION

PATENT NO. : 5,086,704

DATED : February 11, 1992

INVENTOR(S) : WIELAND R. MUELLER

It is certified that error appears in the above-identified patent and that said Letters Patent is hereby corrected as shown below:

Column 3, line 46, after "assembly" insert --16--.

Column 4, line 59, claim 1, after "spring" insert --biasing--.

Signed and Sealed this

Twenty-seventh Day of April, 1993

Attest:

MICHAEL K. KIRK

*Attesting Officer*　　*Acting Commissioner of Patents and Trademarks*